(12) United States Patent
Peng

(10) Patent No.: US 8,714,022 B2
(45) Date of Patent: May 6, 2014

(54) CAPACITANCE PRESSURE SENSOR

(75) Inventor: Qiang Peng, Fuchu (JP)

(73) Assignee: Canon Anelva Corporation, Kanagawa (JP)

( * ) Notice: Subject to any disclaimer, the term of this patent is extended or adjusted under 35 U.S.C. 154(b) by 308 days.

(21) Appl. No.: 13/191,397

(22) Filed: Jul. 26, 2011

(65) Prior Publication Data

US 2012/0024075 A1 Feb. 2, 2012

(30) Foreign Application Priority Data

Jul. 30, 2010 (JP) .................................. 2010-172113
Jun. 20, 2011 (JP) .................................. 2011-135996

(51) Int. Cl.
*G01L 9/12* (2006.01)

(52) U.S. Cl.
USPC .............................................. 73/724; 73/718

(58) Field of Classification Search
CPC .... G01L 9/0073; G01L 9/04; A61B 5/02154; A61B 5/06; A61B 18/1492
USPC ................................................... 73/724, 718
See application file for complete search history.

(56) References Cited

U.S. PATENT DOCUMENTS

| | | | | |
|---|---|---|---|---|
| 4,538,466 A | * | 9/1985 | Kerber | 73/724 |
| 6,772,640 B1 | * | 8/2004 | Quigley et al. | 73/718 |
| 6,877,383 B2 | * | 4/2005 | Horie et al. | 73/754 |
| 7,176,700 B2 | * | 2/2007 | Itakura et al. | 324/689 |
| 7,325,457 B2 | | 2/2008 | Fujimori et al. | 73/724 |
| 8,065,917 B1 | * | 11/2011 | Brown et al. | 73/706 |
| 2007/0056377 A1 | * | 3/2007 | Matsubara | 73/718 |
| 2008/0098820 A1 | | 5/2008 | Morsch et al. | 73/717 |
| 2010/0243884 A1 | | 9/2010 | Shiokawa | 250/282 |

FOREIGN PATENT DOCUMENTS

| | | |
|---|---|---|
| JP | 2007-86002 | 4/2007 |
| JP | 2008-527313 | 7/2008 |

OTHER PUBLICATIONS

U.S. Appl. No. 13/279,081, filed Oct. 21, 2011. Applicant: Nakamura, et al.

* cited by examiner

*Primary Examiner* — Lisa Caputo
*Assistant Examiner* — Brandi N Hopkins
(74) *Attorney, Agent, or Firm* — Fitzpatrick, Cella, Harper & Scinto

(57) ABSTRACT

The present invention provides a capacitance pressure sensor having a traces structure which can stably measure a pressure. A capacitance pressure sensor according to an embodiment of the present invention includes: a substrate having a first insulation layer to a third insulation layer; a diaphragm placed to face the substrate so that a reference chamber is formed between the diaphragm and the substrate; a first electrode on the substrate 1, facing to the diaphragm; a second electrode on the diaphragm, which is disposed so as to face the first electrode; a trace connected to the first electrode, for electrically connecting the first electrode to the outside; and a second trace connected to the second electrode, for electrically connecting the second electrode to the outside. The traces penetrate the first insulation layer from the reference chamber side of the substrate toward the side opposing to the reference chamber of the substrate, and also are bent between each of the insulation layers.

4 Claims, 4 Drawing Sheets

CAPACITANCE PRESSURE SENSOR

BACKGROUND OF THE INVENTION

1. Field of the Invention

The present invention relates to a capacitance pressure sensor.

2. Related Background Art

A capacitance type pressure sensor is known in the art. In a temperature regulated capacitance type pressure sensor, a heater is used to maintain the temperature of temperature-sensitive elements. Japanese Patent Application Laid-Open No. 2007-86002 discloses a capacitance type pressure sensor in FIG. 7, in which the substrate has a heater provided therein.

Japanese Patent Application Laid-Open (Translation of PCT Application) No. 2008-527313 discloses a pressure sensor wherein a steel film provided with distortion gauge resistor elements is mounted on a Low Temperature Co-fired Ceramics (LTCC) substrate. While the pressure sensor of Japanese Patent Application Laid-Open (Translation of PCT Application) No. 2008-527313 is not a type of a capacitance pressure sensor, it is taught that the thermal expansion coefficient of the LTCC-substrate is coincident with that of the steel film which is distorted by a pressure.

However, Japanese Patent Application Laid-Open No. 2007-86002 does not specifically describe traces which are connected to the fixed electrode and the heater, in the pressure sensor. Similarly, Japanese Patent Application Laid-Open (Translation of PCT Application) No. 2008-527313 also does not specifically describe the traces in the pressure sensor using the LTCC substrate.

SUMMARY OF THE INVENTION

The present inventors have found that a traces structure provided inside of a capacitance pressure sensor for an electroconductive member (electrode, for instance) which is needed to be electrically connected to the outside greatly affects a measurement accuracy and stability of the capacitance pressure sensor.

An objective of the present invention is to provide a capacitance type pressure sensor which can stably measure a pressure due to the traces structure.

One aspect of the present invention is a capacitance pressure sensor comprising: a substrate which has insulation layers wherein the insulation layers are laminated; a diaphragm placed to face the substrate so that a space is formed between the diaphragm and the substrate; a first electrode on the substrate, facing to the diaphragm; a second electrode on the diaphragm, which is disposed so as to face the first electrode; a first trace connected to the first electrode, for electrically connecting the first electrode to the outside; a second trace connected to the second electrode, for electrically connecting the second electrode to the outside; wherein the first trace and the second trace penetrate at least one layer on the space side among the plurality of the insulating layers, from the space side of the substrate toward the side opposing to the space of the substrate, and also are bent between a certain layer of the plurality of the insulating layers and another layer laminated on the certain layer.

A capacitance pressure sensor according to the present invention can stably measure the pressure with high accuracy, by devising the traces structure provided inside of the capacitance pressure sensor for the electroconductive member which is needed to be electrically connected to the outside.

DESCRIPTION OF THE PREFERRED EMBODIMENTS

Figure 1:
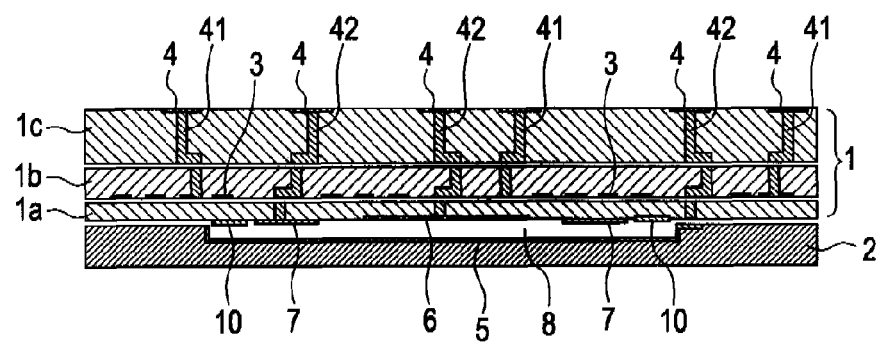
FIG. 1 is a cross-section view of the structure of capacitance sensor in accordance with an embodiment of the present invention.
Figure 2:
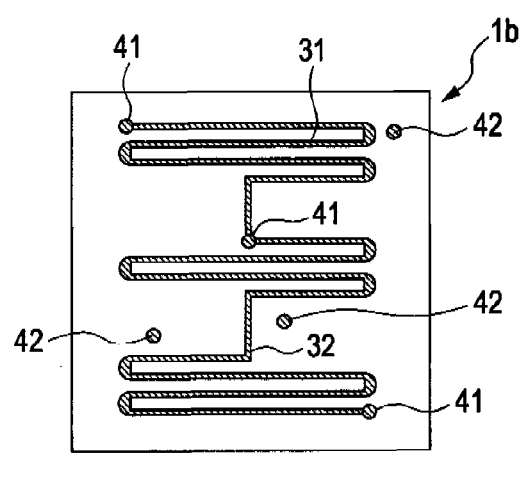
FIG. 2 is a top view of the intermediate layer of LTCC substrate 1b shown in FIG. 1.
Figure 3:
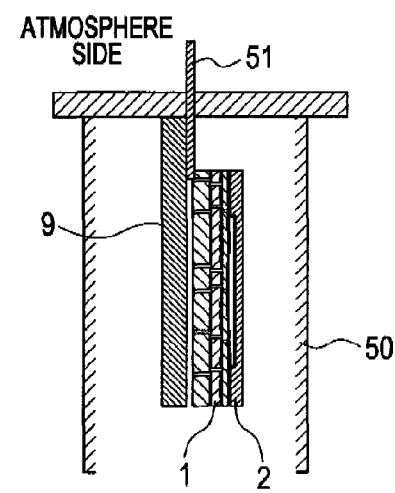
FIG. 3 shows a state in which the pressure sensor is installed in the vacuum chamber according to an embodiment of the present invention.

The embodiments of present invention describe a capacitance pressure sensor which has the properties of corrosive-resistance, thermal stability and good accuracy. The embodiments include the selection of materials, the fabrication of the device, and the items for device designing. Referring to FIGS. 1, 2 and 3, the structure of the pressure sensor according to an embodiment of the present invention will be described below.

FIG. 1 is a cross-section view of the structure of capacitance pressure sensor in accordance with an embodiment of the present invention. A functional capacitance pressure sensor is provided with first and second electrodes 5 and 6, which are placed facing each other at a space. The first electrode (capacity electrode) 6 is on a fixed substrate 1, and is a fixed electrode. The second electrode (movable electrode) 5 is on a thin diaphragm 2, which is deflected by the pressure change in the ambient of the diaphragm 2. The space between these two electrodes 5 and 6 forms a reference chamber 8, which keeping at vacuum. In other words, the electrode 5 and the electrode 6 are placed so as to oppositely face each other through the reference chamber 8 which is a cavity portion (space). When the diaphragm 2 is deflected by the pressure, the distance between the first and second electrodes 5 and is changed. As a result, the capacity between the electrodes 5 and 6 placed in parallel in an initial state changes, and the change of the capacity is detected as the change of pressure. In addition, a reference electrode 7 is provided in the vicinity of the capacity electrode 6 so as to correct errors due to the mechanical distortion originating by the difference of a thermal expansion coefficient (environmental temperature change) between sensor components.

There are some difficulties to produce an elaborate capacitance pressure sensor. In order to achieve high sensitivity, the two parallel electrodes 5, 6 should be placed in a small distance of several µm to hundreds µm range. And the thickness of the diaphragm 2 should also be fabricated in such several µm to hundreds µm range. The diaphragm 2 in the present example has the thickness from 10 µm to 1,000 µm. It is difficult to ensure the location and size accuracy using conventional machining method. Moreover, it's a challenge to seal the reference chamber 8 with small dimension and high accuracy.

When there is no pressure difference between the outer surface and inner surface of the diaphragm 2, the diaphragm 2 should keep flat, and any undesired deformation would degrade the accuracy. The undesired deformation of the diaphragm is usually caused by the stress in the diaphragm 2, which is introduced during the manufacture process or caused by different thermal expansion of sensor materials when temperature changes. In the present embodiment, Low Temperature Co-fired Ceramics (hereinafter called LTCC) substrate 1 with low thermal expansion and the silicon carbide (SiC) diaphragm 2 are used to solve the above problems. And the MEMS manufacture processes are used to control the dimension accuracy in the μm scale.

In the present embodiment, the single crystal SiC is chosen as the material of the diaphragm 2, as the SiC has high corrosive-resistant and high thermal conductivity coefficient. Compared with CVD SiC, the single crystal SiC has better crystal structure, which avoids or reduces the pin holes. The diaphragm 2 could be fabricated in a thickness of tens μm to hundreds μm. The coefficient of thermal expansion (CTE) of SiC is lower at 4.5 ppm/° C., compared with 7 ppm/° C. for $Al_2O_3$ and above 10 ppm/° C. for inconel alloys. The thermal conductivity coefficient (TCE) of SiC is about 370-490 W/m/K, which is more than one order better than $Al_2O_3$ and Inconel alloys. The advanced thermal properties make it easy to build a sensor diaphragm with good temperature uniformity and high stability. Table 1 compares the thermal properties of materials used in conventional vacuum gauges.

TABLE 1

Thermal properties of material

| | \multicolumn{8}{c}{Material} | | | | | | | |
|---|---|---|---|---|---|---|---|---|
| | SiC | LTCC | Si | Pyrex | $Al_2O_3$ | Al | Inconel | SUS |
| Thermal conductivity (W/m/K) | 370-490 | 3.6 | 168 | 1.005 | 27.21 | 237 | 10-20 | 5-30 |
| Thermal expansion coefficient (ppm/K) | 4.5 | 4.5 | 4 | 4- | 7 | 23 | 10- | 17 |

In this embodiment, the LTCC substrate 1 including a plurality of insulating layers is selected to construct the substrate 1 of capacitance pressure sensor. The thermal expansion coefficient of LTCC substrate 1 can be adjusted to almost the same as the SiC diaphragm 2 by tuning the composition of co-fired materials. Thus minimizes the thermal expansion mismatch between the diaphragm 2 and substrate 1, reduces the stress in the diaphragm.

The LTCC is a commonly used material to provide packages for the integrated circuits. The manufacturing process of LTCC circuit is similar as the printing circuit board. The LTCC board is made of multilayer ceramic green sheets (insulating layer), which includes a mixture of glass and ceramics materials. First, the powder of $Al_2O_3$, glass and $B_2O_3$ are dissolved in isopropyl alcohol and mixed in a pot mill to form a slurry, the grains size of mixture particles being under 5 μm. Then, the slurry is flatted on a carrier tape to make a green sheet (a thin flat sheet formed by a ceramic slurry comprising the ceramic powder and the dispersion medium.), which has the thickness ranging from 20 μm to 300 μm. On the green sheet, the designed circuit patterns and connecting vias are produced using printing method. After then, several layers of green sheets are stacked together and laminated under 200 atmosphere pressure, while heated by a temperature program up to about 900° C. Under this condition the ceramic materials are densified and co-fired to form a single LTCC circuit board.

In the present embodiment, the LTCC substrate 1 comprises by a first insulation layer 1a, a second insulation layer 1b and a third insulation layer 1c, which are laminated.

The third insulation layer 1c is desirably formed to be thicker than the second insulation layer 1b so as to reduce the influence of the stress, and has the thickness of 800 μm or more. The material of the third insulation layer 1c has preferably high corrosion resistance, and includes, for instance, AlN, ceramic and alumina ($Al_2O_3$). On the other hand, the material of the second insulation layer 1b has preferably high thermal conductivity so as to transfer heat of the heater 3, and includes, for instance, AlN, Si and SiC. The first insulation layer 1a has a plurality of through holes provided therein, and traces 42 are provided through the through holes, which work as a first trace for connecting the first electrode 6 to the outside, and work as a second trace for connecting the third electrode 7 to the outside. Similarly, the second insulation layer 1b and the third insulation layer 1c also have a plurality of through holes provided therein so as to deviate from the through holes of the first insulation layer 1a, and a trace 42 for connecting the electrodes 6 and 7 to the outside is provided. The trace 42 that passes through the through hole in the first insulation layer 1a and the trace 42 that passes through the through hole of the second insulation layer 1b, which have been provided so as to deviate from each other as in the above way, are connected to each other by a trace 422 in the interlayer between the first insulation layer 1a and the second insulation layer 1b.

Incidentally, in the present specification, both of the above described first trace to be connected to the first electrode 6 and the above described second trace to be connected to the second electrode 5 are referred to as the trace 42 (electrical connection trace to electrode).

Furthermore, a plurality of heaters 3 are provided between the first insulation layer 1a and the second insulation layer 1b. A plurality of through holes are provided in the second insulation layer 1b, and a trace (electrical connection trace to heater) 41 is provided through the through hole, which works as a third trace for connecting the plurality of the heaters 3 to the outside. Similarly, also in the third insulation layer 1c, a plurality of through holes are provided so as to deviate from the through holes in the second insulation layer 1b, and traces 41 are provided so as to connect the plurality of the heaters 3 to the outside. The trace 41 that passes through the through hole in the second insulation layer 1b and the trace 41 that passes through the through hole of the third insulation layer 1c, which have been provided so as to deviate from each other as in the above way, are connected to each other by a trace 411 in the interlayer between the first insulation layer 1a and the second insulation layer 1b.

Thus, by providing the through holes and the traces 41 and 42 so as to be bent (jagged) from one face of the substrate 1 (face having electrode 6 provided thereon, in other words, space side) toward the other face opposing to the one face (opposite side to the space), the leak of the gas, which flows into the reference chamber 8 from the outside through the through holes, can be reduced.

Incidentally, in the present embodiment, all of the traces to the heaters and the electrodes are placed so as to be connected to the outside from the surface of the third insulation layer 1c, but the placing method is not limited to this. The traces may be connected to the outside from the interlayer between the first insulation layer 1a and the second insulation layer 1b or the interlayer between the second insulation layer 1b and the third insulation layer 1c through the side face side of the substrate. For instance, as for the traces structure of the traces 42, when the traces are connected from the interlayer between the first insulation layer 1a and the second insulation layer 1b to the side face side of the substrate 1, the traces 42 extend in the first insulation layer 1a along the above described direction directed from one face of the substrate 1 toward the other face, and is bent in the interface between the first insulation layer 1a and the second insulation layer 1b toward the side face side of the substrate 1 along the interface.

The trace 42 which connects the electrode (second electrode) 5 on the diaphragm to the outside is provided so as to penetrate the first insulation layer 1a and be bent in the interlayer between the first insulation layer 1a and the second insulation layer 1b. Thereby, the contamination of the chamber 8 by gas through gaps between the traces and the through holes can be prevented.

In the present embodiment, the traces 42 for electrically connecting the electrodes 5 to 7 provided inside of the capacitance pressure sensor to the outside are provided so as to be bent from one face of the substrate, having the electrodes 6 and 7 formed thereon inside of the substrate 1, and are led to the outside of the substrate 1. Accordingly, when there is a gap between the through holes for providing the traces 42 therein and the traces 42, the gas passing through the gap results in experiencing a labyrinth structure. Accordingly, the leak of the gas to the reference chamber 8 from the outside through the through holes for forming the traces 42 therein for electrically connecting the electrodes 5 and 7 to the outside and the traces 42 can be reduced. Accordingly, an unintentional leak of the gas into the reference chamber 8 is reduced, and accordingly the pressure can be stably measured with high accuracy.

FIG. 2 is a bottom view of the second insulating layer 1b of LTCC substrate 1 as an intermediatelayer. The pattern of heater film can be designed to balance the thermal transfer, so as to achieve uniform temperature distribution. Two section heater films 31, 32 with three connection vias 41 are provided on the second insulating layer 1b. Different areas on the second insulating layer 1b can be heated separately using different heater films 31, 32. By applying different power on the two section heater films 31, 32, the uniformity temperature distribution on the second insulating layer 1b can be improved. In addition, the number of the heater films may also be two or more, and the temperatures of the respective heater films can be desirably adjusted individually (Heating power can be adjusted.).

FIG. 3 is a view of illustrating a state in which the capacitance pressure sensor illustrated in FIG. 1 is installed. The capacitance pressure sensor can be mounted on a heat sink 9 and directly installed in an unshown vacuum chamber. The function of the heat sink 9 is to balance the thermal conduction between the ambient and the capacitance pressure sensor so as to improve the response speed for the temperature controlling system. When the sensor is not mounted on the heat sink 9, after the inside of the container 50 has been evacuated, the thermal conduction between the sensor and the container 50 is almost conducted through the thermal conduction of the trace 51. The trace 51 is thin and has small thermal conduction. Because of this, it takes a long time for the temperature, which has been lowered by adiabatic expansion that occurs when the exhaust of the vacuum chamber has started, to return to the original temperature. Accordingly, the zero point of the sensor correlating with the sensor temperature continues drifting, and it takes a long time for the sensor temperature to return to the original value. According to an embodiment of the present invention, the heat sink 9 made from AlN with high corrosion resistance and thermal conductivity improves the response of the capacitance pressure sensor. Moreover, the heat sink 9 together with the in situ heater 3, could balance the thermal transfer between the ambient and the capacitance pressure sensor. Such structure enables accurate temperature controlling, improves the stability and accuracy.

In the container 50 illustrated in FIG. 3, the temperature in the upper portion of the capacitance pressure sensor is relatively low, because the upper portion is adjacent to a room temperature portion (atmosphere side) and the heat of the heater 3 is radiated. On the contrary, the temperature in the lower portion of the capacitance pressure sensor is relatively high. Accordingly, as was described above, the capacitance pressure sensor has a plurality of heaters 3 provided in the substrate, enables the temperature of each of the heaters 3 to be adjusted individually, and thereby can keep the temperature in the container uniform.

The manufacture process of the pressure sensor, according to an embodiment of the present invention will be described with reference to FIGS. 4A and 5.

The circuit patterns and vias 4 in LTCC substrate 1 provide the external connection for the sensor electrodes 5, 6, 7. By tuning the composition of mixture powders, the coefficient of thermal expansion (CTE) of LTCC is adjusted to about 4.5 ppm/° C., which is nearly equal to the CTE of SiC. The LTCC substrate 1 and SiC diaphragm 2 are anodically bonded after then. The anodic bonding method provides a hermetic sealing without using any adhesive materials, which ensures the location accuracy of the bonding parts. The bonded LTCC substrate 1 and SiC diaphragm 2 have similar coefficient of thermal expansion, as low as 4.5 ppm/° C., which minimizes the stress in the sensor chip. Thus, the undesired deformation of the diaphragm could be inhibited. The difference of CTE between material of substrate and material of diaphragm is no more than 1 ppm/° C.

Figure 4A:
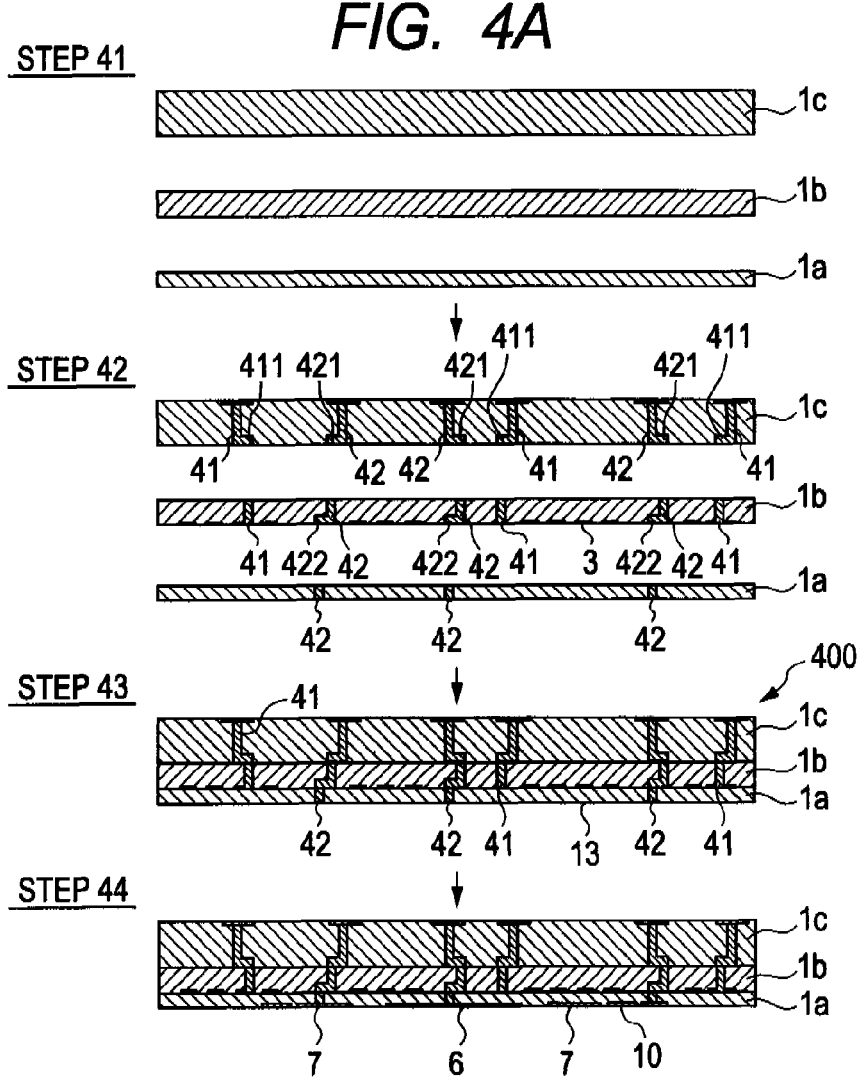
FIG. 4A is a view of illustrating the fabrication process of the substrate which is provided so as to oppose to a diaphragm, in a capacitance pressure sensor according to an embodiment of the present invention.
Figure 4B:
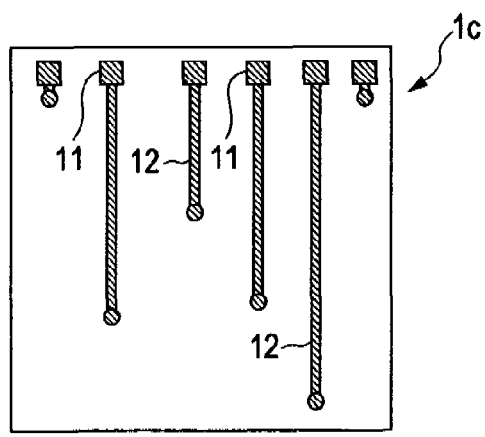
FIG. 4B is a view of illustrating a circuit pattern on the substrate 1c illustrated in FIG. 1.

The FIG. 4A shows the manufacture process of the LTCC substrate in accordance with an embodiment of the present invention. FIG. 4A illustrates a cross-section view of three first to third insulation layers (which may be referred to as "ceramic layer", hereinafter) 1a, 1b and 1c. FIG. 4B is an electric circuit pattern on the third insulation layer (back layer) 1c, and one example of the heater film pattern is shown in FIG. 2.

In step 41, three ceramic layers 1a, 1b and 1c which are components of the LTCC substrate 1 are prepared. The third insulation layer 1c which is the back layer is a thick plate having a plurality of ceramic green sheets, and finally is sintered and densified (co-fired) to about 800 μm. Thereby, the third insulation layer 1c becomes a rigid support for other layers.

While the illustrated LTCC substrate 1 comprises three ceramic layers, it is not limited to this substrate. In order to provide a trace which is bent at least one time inside of the LTCC substrate 1, the LTCC substrate includes preferably at least two ceramic layers. The substrate is not limited to the LTCC substrate, but may also use an HTCC (High Temperature Co-fired Ceramic) substrate. Specifically, in an embodiment of the present invention, a substrate which is the base substance to have the electrodes 6 and 7 provided therein has at least two insulation layers, for instance, such as the LTCC substrate and the HTCC substrate. In the present embodiment, the reason why the base substance includes at least two insulation layers provided therein is because the above described base substance has the trace provided therein which is bent at least one time from one face of the base substance, on which the electrodes 6 and 7 are formed, toward the other face opposing to the one face. As in the present embodiment, when the trace is bent in the inside of the above described base substance from the above described one face toward the other face, in order to form a labyrinth structure against the gas, and when one end of the trace is located in the above described one face, the bent structure of the trace can be easily formed in the interface between the two insulation layers by laminating at least two insulation layers.

The heater 3 (heater films 31 and 32 in FIG. 2) is formed in the intermediate between the ceramic layers 1a and 1b. The temperature of the heater 3 is maintained at a substantially constant value in the range of 45° C. to 250° C. By maintaining the constant temperature, the distortion due to the difference in a thermal expansion coefficient between the substrate 1 and the diaphragm 2 is inhibited. Since the heater 3 sandwiched by the ceramic layers is not exposed to the external ambient, the heater 3 is protected from corrosion and also has high thermal efficiency. Specifically, by providing the heater 3 inside of the substrate 1, the capacitance pressure sensor can protect the heater 3 without exposing the heater to the outside and can enhance the durability of the heater.

The front layer (ceramic layer) 1a has feedthrough connection vias 42 for the electrodes 5, 6 and 7, and the thickness of the LTCC front layer 1a is only 50 μm, which can enhance the thermal conduction efficiency from the heater 3 to the SiC diaphragm 2. The intermediate layer (ceramic layer) 1b functions as the carrier of the in situ heater 3, which has a thickness of about 200 μm. The back layer (ceramic layer) 1c provides the rigid support for the heater 1b and diaphragm 2, which has a thickness of no less than 800 μm, and the thicker the better. On the surface of the back layer 1c, the electric pads 11 are formed, working as external connection for installing the sensor chip (FIG. 4B). The internal electric vias 4 includes Ag, and the surface circuit patterns 12 include Ni/Au as for corrosion-resistant.

In the step 42, as is illustrated in FIG. 2, an in-situ heater 3 (heater films 31 and 32) is fabricated on the face of the second insulation layer 1b which is an intermediate layer, touching the first insulation layer 1a. Au/Pt films are formed as the heater 3 using printing method. Because the Pt has a high TCR (temperature coefficient of resistance), the heater films 31, 32 are also used for the internal temperature sensor. The pattern of the heater films 31, 32 is carefully designed in order to achieve uniform temperature distribution.

In addition, in the step 42, a through hole for the trace 42 is formed at the desired position of the first insulation layer 1a, and a paste (Au powder and binder, for instance) for the trace is embedded into the through hole for the trace 42. Similarly, the through holes for the trace 42 are formed in each of the second insulation layer 1b and the third insulation layer 1c, and the paste for the trace is embedded into the through holes for the trace 42. In this case, as is illustrated in FIG. 1, the through hole for the trace 42 formed in the first insulation layer 1a, the through hole for the trace 42 formed in the second insulation layer 1b, and the through hole for the trace 42 formed in the third insulation layer 1c are placed so as to deviate from each other.

As described above, the heater films 31 and 32, as illustrated in FIG. 2, are formed on one face of the second insulation layer 1b. Then, the through hole for the trace 41 is formed at a position in the second insulation layer 1b, which is different from that of the through hole for the trace 42, so as to overlap with one part of the heater films 31 and 32, and the paste for the trace is embedded into the through hole for the trace 41. Similarly, the through hole for the trace 41 is formed at a position in the third insulation layer 1c, which is different from the through hole for the trace 42, and the paste for the trace is embedded into the through hole for the trace 41. In this case, as is illustrated in FIG. 1, the through hole for the trace 41 formed in the second insulation layer 1b, and the through hole for the trace 41 formed in the third insulation layer 1c are placed so as to deviate from each other.

Then, a traces pattern 421 which is one part of the trace 42 and is a bent portion of the trace 42 is formed on the face of the third insulation layer 1c, which touches the second insulation layer, so as to touch the paste for the trace, which has been embedded into the above described through hole for the trace 42. Similarly, a traces pattern 422 which is one part of the trace 42 and is a bent portion of the trace 42 is formed on the face of the second insulation layer 1b, which touches the first insulation layer, so as to touch the paste for the trace, which has been embedded into the above described through hole for the trace 42.

Similarly, a traces pattern 411 which is one part of the trace 41 and is a bent portion of the trace 41 is formed on the face of the third insulation layer 1c, which touches the second insulation layer, so as to touch the paste for the trace, which has been embedded into the above described through hole for the trace 41.

Subsequently, in the step 43, the first insulation layer 1a, the second insulation layer 1b and the third insulation layer 1c are bonded to each other, subjected to a sintering process, and melted to form the substrate 1 which is a single ceramic substrate.

As a result, a conductor (paste for trace) formed in the through hole for the trace 42 of the third insulation layer, the traces pattern 421 formed between the third insulation layer 1c and the second insulation layer 1b, and a conductor formed in the through hole for the trace 42 of the second insulation layer are electrically connected in a form of being bent between the third insulation layer 1c and the second insulation layer 1b. Similarly, a conductor formed in the through hole for the trace 42 of the second insulation layer, the traces pattern 422 formed between the second insulation layer 1b and the first insulation layer 1a, and a conductor formed in the through hole for the trace 42 of the first insulation layer are electrically connected in the form of being bent between the second insulation layer 1b and the first insulation layer 1a. Thus, the bent trace 42 is formed in the substrate 1.

As for the trace 41, similarly to the trace 42, a conductor formed in the through hole for the trace 41 of the third insulation layer, the traces pattern 411 formed between the third insulation layer 1c and the second insulation layer 1b, and a conductor formed in the through hole for the trace 41 of the second insulation layer are electrically connected in the form of being bent between the third insulation layer 1c and the second insulation layer 1b. Thus, the bent trace 41 is formed in the substrate 1.

It should be noticed that a method for forming the above described bent traces 41 and 42 is not limited to that in the above described embodiment. For instance, a groove corresponding to the above described traces pattern 421 is formed on the face of the third insulation layer, which touches the second insulation layer, and a through hole is formed from the face having the groove formed therein toward the face opposing to the face, so as to include one part of the groove. Subsequently, a conductor is embedded into the through hole and the groove. The through hole is formed also in the second insulation layer, and the conductor is embedded into the through hole. Subsequently, the second insulation layer and the third insulation layer are bonded to each other so that the conductor embedded in the through hole of the second insulation layer is connected with a portion of the conductor embedded in the third insulation layer, which does not overlap with the through hole of the third insulation layer. Thereby, the trace which has a bent portion in the interface between the second insulation layer and the third insulation layer can be provided in the substrate 1.

As described above, each of the ceramic layers 1a, 1b, 1c is bonded together (Step 43), and melted to form one single ceramic substrate in the sintering process. Because the electric patterns and vias in each layer could be aligned and connected according to the pattern design, the electric vias 4 in each layer are connected in the sintering process, forming the internal electric circuit. As shown in product 400, the electric vias 4 of the first insulating layer 1a, the second insulating layer 1b and the third insulating layer 1c are connected jaggedly therebetween. In other words, the through hole of the first insulation layer 1a, the through hole of the second insulation layer 1b, and the through hole of the third insulation layer 1c are provided so as to deviate from each other, and the traces are connected along the interlayer. Such a bent traces structure can minimize the leakage of gas from the outside of the sensor chip into the reference chamber 8. Because the pathway of leak gas is in jagged pattern and is much longer than the pathway of the connection passing through the layers in a straight line.

In Step 43, in order to perform anodic bonding, the surface 13 of the front layer 1a is polished to Ra<0.1 μm. The patterned Au/Cr electrodes 6, 7 and getter material 10 are deposited on the polished surface in Step 44 after then.

As discussed above, the accuracy and sensitivity of the capacitance pressure sensor is mainly depending on the SiC diaphragm 2. The thickness of the diaphragm 2, the gap between the diaphragm 2 and the substrate 1 are very important for the capacitance pressure sensor. Especially for a pressure sensor such as 0.1 Torr range, the gap between the diaphragm 2 and substrate 1 is preferred less than 10 μm. Conventionally, the diaphragm is manufactured by mechanical machining, and the gap is formed during the sealing process using some kind of stopper, which keeps the distance between diaphragm 2 and substrate 1. Such process should be performed very carefully, and actually it is less accurate in the μm scale. In an embodiment of the present invention, the MEMS fabrication process is used to make the SiC diaphragm 2 and the reference chamber 8. The MEMS technology is commonly used to fabricate the miniaturized sensors, providing the dimension accuracy from nano-meter to micro-meters.

Figure 5:
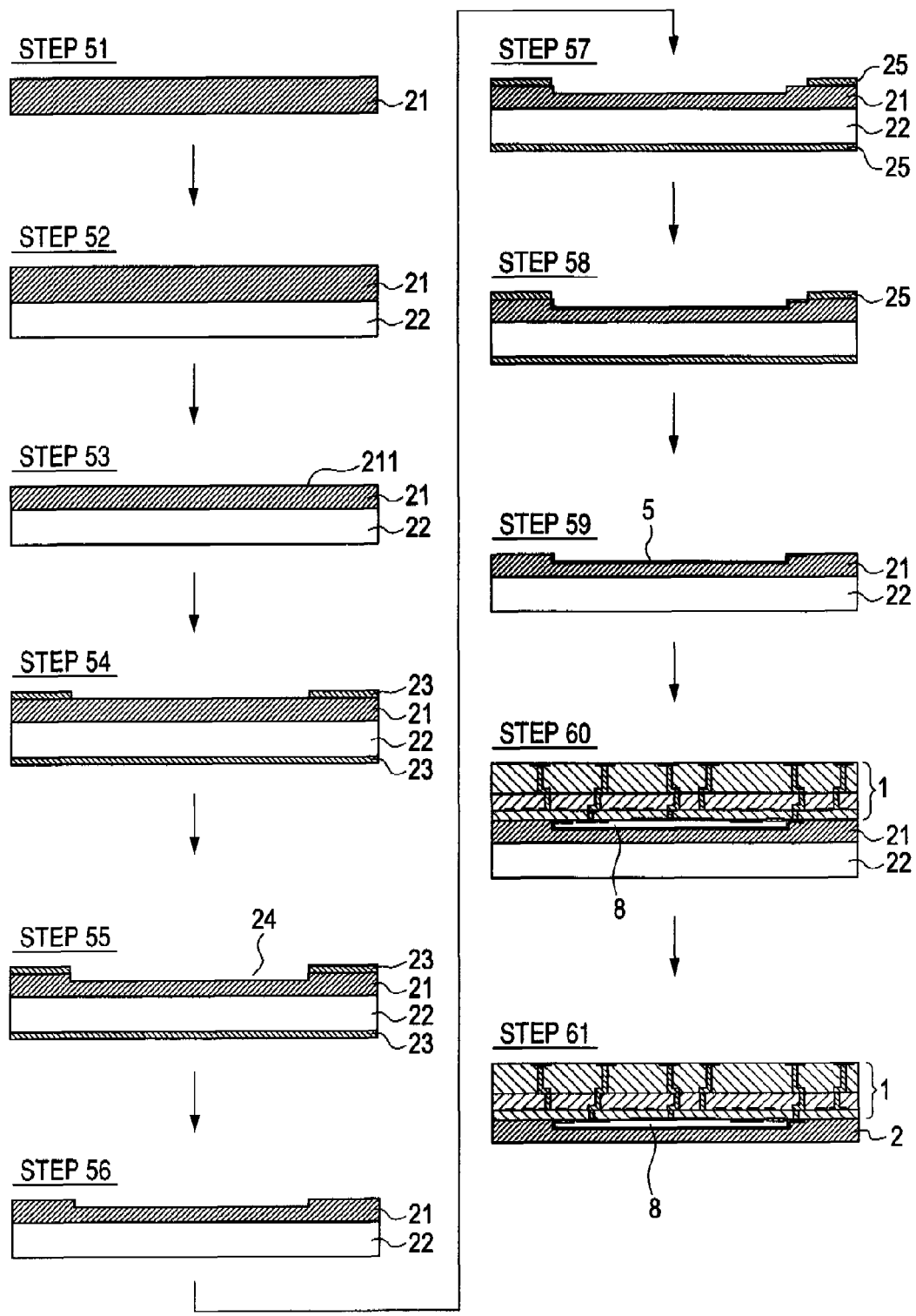
FIG. 5 is a view of illustrating the fabrication process of the diaphragm which is provided in a capacitance pressure sensor according to an embodiment of the present invention.

FIG. 5 illustrates the manufacture process for the condition that the SiC diaphragm 2 is thinner than 100 μm according to an embodiment of the present invention. The thickness of commercial single crystal SiC wafer is from 240 μm to 550 μm, depending on the product series. In order to handle and protect the SiC film during the manufacture process, the SiC wafer 21 prepared in Step 51 is temporarily bonded to a carrier wafer 22 in Step 52. Then in Step 53, the bonded structure of the wafer 21 and wafer 22 is lapped thinner to the defined thickness using a conventional lapping machine. After the lapping process, the SiC wafer 21 is thinned to less than 100 μm. That is, in Step 53, the surface 211 of SiC 21 is polished to roughness of Ra<0.1 μm, which is important for successful anodic bonding.

In the etching process of Step 54, a patterned Ni mask 23 is formed on the SiC wafer 21 surface, exposing a circular area to be etched. In Step 55, the SiC wafer 21 is etched by dry reactive ion etching (DRIE) method, forming a cavity 24 with depth of about 10 μm. In Step 56, after the etching process, the Ni mask 23 is removed using an acid solution-wet etching. Then, in Step 57, a photo resist mask 25 is formed on the SiC surface, followed by a sputtering process. In Steps 58 and 59, through the sputtering process, an electric conductive thin film 5 as an electrode is deposited on the bottom surface of the etched cavity 24 and the photo resist mask 25 is removed.

In Step 60 as the sealing process, the structure of the wafer 21, 22 and the LTCC substrate 1 formed by the method shown in FIG. 4A are anodically bonded in a vacuum chamber, under the pressure less than $10^{-2}$ Pa. A vacuum reference chamber 8 is formed between the wafer 21, which becomes the SiC diaphragm 2, and the LTCC substrate 1. During the bonding process, the temperature is increased to about 400° C., when the getter material 10 on the LTCC substrate 1 is activated. The getter material 10 is some kind of active metal alloy, which could absorb gas molecular effectively, keeping the vacuum condition of reference chamber 8 for long-term operation. In Step 61, the SiC diaphragm 2 is released by removing the temporarily bonded glass wafer 22 after the bonding process.

It should be noticed that, if the thickness of diaphragm 2 is thicker than 100 μm, the manufacture process could be simplified, as the glass carrier wafer 22 is not necessary. The single crystal SiC wafer 21 could be lapped and polished to the defined thickness, and followed by the next etching, sputtering and bonding process directly.

As shown in FIG. 4A and FIG. 5, the finally fabricated capacitance pressure sensor involves a SiC diaphragm 2 and a LTCC substrate 1. These two parts are bonded together to form a vacuum reference chamber 8. The metal thin film is deposited on the inner surface of SiC diaphragm and LTCC substrate, forming the ground electrode on SiC diaphragm 2, and the detecting electrode 6 and reference electrode 7 on LTCC substrate 1. These electrodes are connected to external electric pads through the vias 4 and electric traces circuit patterns 12 in the LTCC substrate 1 (see FIG. 4B). When the sensor chip is installed in the vacuum chamber, the SiC diaphragm 2 is deflected by the chamber atmosphere-pressure (outside pressure). The capacitance between the detecting electrode 6 and the ground electrode 5, or between the reference electrode 7 and the ground electrode 5 are changed by the deflection of the diaphragm 2. Thus, the pressure to be detected is converted to the electric signal, which can be measured by the external circuits.

Figure 6:
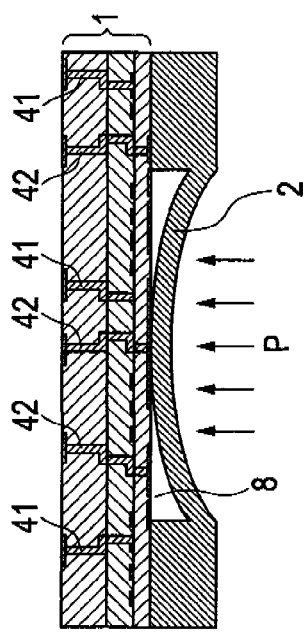
FIG. 6 is a cross-section view of showing the condition when the diaphragm touches the substrate under high pressure according to an embodiment of the present invention.
Figure 7:
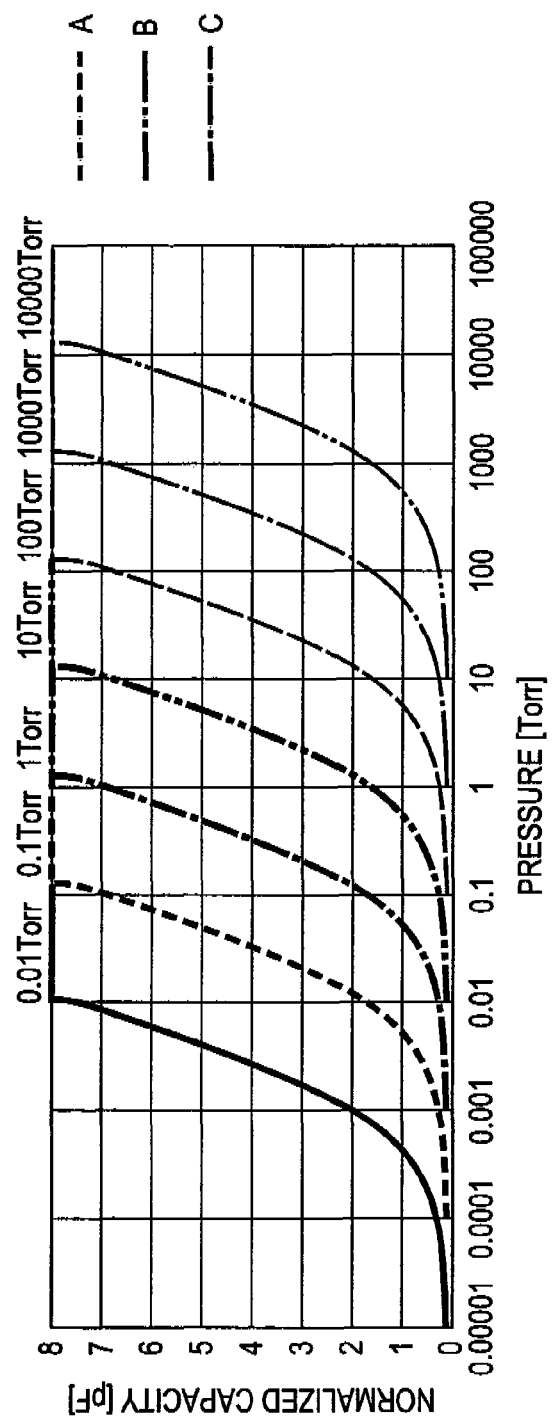
FIG. 7 is a diagram of showing curves of the simulation result when designing sensor chips for different dynamic range according to an embodiment of the present invention.

Referring to FIGS. 6 and 7, the design matters of the pressure sensor according to an embodiment of the present invention will be described below. There are a lot of parameters for designing the sensor chip. When the diaphragm 2 of sensor chip is deflected by outside pressure, the deflection of diaphragm 2 is increased by the increasing of outside pressure. As shown in FIG. 6, when the center of the diaphragm 2 touches the substrate 1, the output signal will be saturated. Normally, the dynamic range of sensor chip is between the saturation point and down to 3 orders smaller than the saturation point (i.e., 1000:1).

The sensitive dynamic range of the sensor chip is decided by several factors, including the mechanical property of diaphragm material, the diameter and thickness of the diaphragm, and the gap distance between two parallel electrodes. In order to measure the pressures with different range, a series sensor chip with different dimensions should be designed. For different dynamic ranges, the dimension of the sensor chip is simulated in detail, based on the property of silicon carbide. For example, it is assumed that the diameter of diaphragm 2 is fixed at 1 inch (25.4 mm) and the distance of gap is fixed at 10 μm (formed by the etching depth). If the demanded dynamic range is 0.0001 Torr to 0.1 Torr, the thickness of diaphragm 2 will be about 35 μm (curve A in FIG. 7); if the demanded dynamic range is 0.01 Torr to 10 Torr (curve B in FIG. 7), the thickness of diaphragm 2 will be about 130 μm; if the demanded dynamic range is 1 Torr to 1000 Torr (curve C in FIG. 7), the thickness of diaphragm will be about 550 μm. FIG. 7 shows the simulated response curves of the sensor with different dynamic ranges (The simulated result is normalized to 0 pF to 8 pF range for comparison.).

What is claimed is:

1. A capacitance pressure sensor comprising:
   a substrate formed of a plurality of laminated insulation layers;
   a diaphragm facing the substrate forming a space between the diaphragm and the substrate;
   a first electrode on the substrate, the first electrode facing the diaphragm;
   a second electrode on the diaphragm, the second electrode facing the first electrode;
   a first trace connected to the first electrode, for electrically connecting the first electrode to an outside of the sensor;
   a second trace connected to the second electrode, for electrically connecting the second electrode to an outside of the sensor;
   wherein the first trace and the second trace penetrate at least one insulation layer of the plurality of laminated insulation layers on the space side among the plurality of laminated insulation layers, from the space side of the substrate toward the side opposing the space side of the substrate, and
   wherein the first trace and the second trace are bent between a first insulation layer of the plurality of laminated insulation layers, and a second insulation layer of the plurality of laminated insulation layers.

2. The capacitance pressure sensor according to claim 1, further comprising a heater provided at least in one interlayer among the plurality of the laminated insulation layers.

3. The capacitance pressure sensor according to claim 2, wherein the heater has at least two portions, and the heating power of each portion can be adjusted individually.

4. The capacitance pressure sensor according to claim 1, wherein the substrate is a low temperature co-fired ceramic (an LTCC) substrate or a high temperature co-fired ceramic (an HTCC) substrate.

* * * * *